Jan. 25, 1966  A. MENUTO  3,231,713
LIQUID HEATER FOR VEHICLES
Filed Aug. 27, 1962
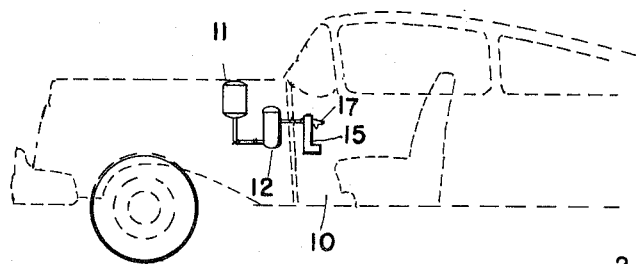
FIG. 1
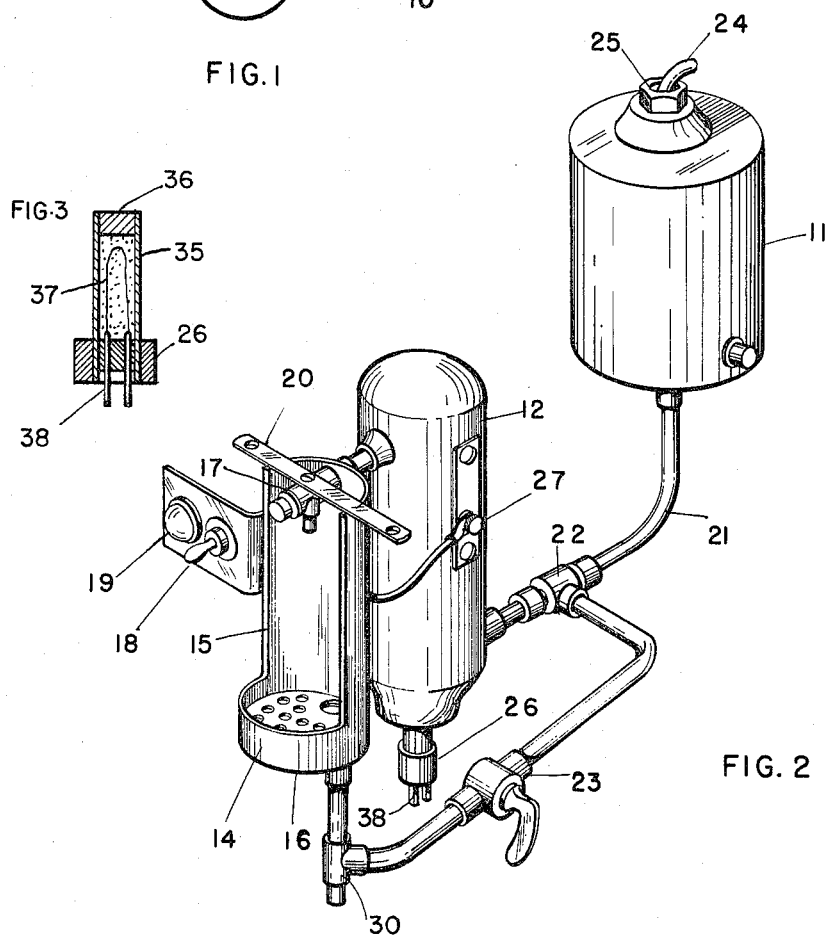
FIG. 3
FIG. 2
INVENTOR.
ANGELO MENUTO
BY
Charles L Loverdush
attorney

United States Patent Office 3,231,713
Patented Jan. 25, 1966

3,231,713
LIQUID HEATER FOR VEHICLES
Angelo Menuto, 4226 Harding St., Erie, Pa.
Filed Aug. 27, 1962, Ser. No. 219,533
1 Claim. (Cl. 219—202)

This invention relates to heaters and, more particularly, to liquid heaters for heating water and the like for domestic purposes in automotive vehicles.

This application is a continuation-in-part of patent application, Serial No. 82,274, filed January 12, 1961, which issued as Patent No. 3,148,675 on September 15, 1964.

Various types of water heaters have been provided; however, none of these have been fully satisfactory.

It is, accordingly, an object of the present invention to provide an improved water heater for use in an automotive vehicle.

Another object of the invention is to provide a water heater which is simple in construction, economical to manufacture, and simple and efficient to use.

A further object of this invention is to provide an improved combination water heater and motor vehicle.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

FIG. 1 is a view partly in phantom of a heater according to the invention installed in an automotive vehicle;

FIG. 2 is an isometric view of the water heater; and

FIG. 3 is a view of the heater used.

Now with more particular reference to the drawing, an automotive vehicle 10 is shown in phantom lines with a supply tank 11 and a heating tank 12 supported in the engine compartment thereof and a sink 14 in the passenger compartment behind the firewall.

The supply tank 11 has a breather pipe 24 extending out of the top of a plug 25. The tank 11 may be filled by removing the plug 25. The breather pipe allows air to enter to replace the water as it is used up.

The sink 14 has a bottom which is generally cylindrical in form with a screen forming a bottom therein to support various articles or cups to be filled. A hemicylindrical backsplash 15 forms a continuation of one side of the cylindrical bottom and extends upwardly. A mounting bar 20 is welded to the upper ends of the hemicylindrical backsplash 15 and attached to a faucet 17 by means of screws as shown. Suitable holes are provided in the bar 20 to attach it to the dashboard of a vehicle or the like.

The bottom of the supply tank 11 is connected to the bottom of the heating tank 12 by means of a line 21 which is, in turn, connected through a T 22 and a faucet 23 to the bottom of a T 30 which is, in turn, connected to the drain line of the sink 14. Thus, both the heating tank 12 and the supply tank 11 can be drained through the T 30 to prevent them from freezing when not in use.

It will be noted that the bottom of the supply tank 11 is above the level of the top of the heating tank 12. Therefore, so long as there is any liquid in tank 11, it will keep the heating tank full to a point above the faucet 17. Further, since the faucet 17 is connected to the top of the heating tank 12, the heating tank can never run dry and, therefore, the heating element therein will not be subjected to operating without water surrounding it.

The heating element can be heated by means of plugs 26 connected to a suitable source of electricity, for example, the automobile battery. The electricity can be turned on and off by means of a switch 18 which is connected through a terminal 27 to the heating element.

The plug 26 forms a closure for an opening in the bottom of the tank 12. A copper tube 35 is attached to the plug 26. The upper end of the tube 35 is sealed by a plug 36 which is soldered in place therein. A heat treated nickel chromium alloy wire 37 is connected across terminals 38. It is embedded in a refractory powder as shown.

A pilot light 19 is supported on the mounting bar 20 alongside the switch 18 so that it will indicate when the device is turned on.

It will be noted from an examination of the device disclosed herein that a simple, economical, and practical heating device for liquids for vehicles has been provided which is so designed that it will protect its heating element against running dry and the entire system can be drained by one simple faucet 23.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

In combination, an automotive vehicle and a liquid heater attached thereto, said liquid heater comprising a supply tank, a heating tank, a sink, having a drain line connected thereto, the bottom of said supply tank being connected to the bottom of said heating tank, the top of said heating tank being connected to a faucet, said faucet being disposed above said sink, the bottom of said supply tank being disposed above the top of said heating tank, the bottom of said supply tank also being disposed above said faucet, electrical heating means in said heating tank, drain means connecting the bottom of said supply tank and the bottom of said heating tank to said drain line of said sink, said vehicle having an engine compartment and a passenger compartment and a fire wall separating said engine compartment from said passenger compartment, said heating tank and said supply tank being disposed in said engine compartment, said sink and said faucet being disposed in said passenger compartment, said sink being generally cylindrical in shape at its bottom and semi-cylindrical at its top, said faucet being attached to the inside of said semi-cylindrical part.

References Cited by the Examiner
UNITED STATES PATENTS

| | | | |
|---|---|---|---|
| 1,665,949 | 4/1928 | Chambers | 219—312 |
| 1,899,839 | 2/1933 | Von Ruden | 219—305 |
| 2,340,638 | 2/1944 | Boysworth | 219—305 |
| 2,428,466 | 10/1947 | Palm | 219—314 X |
| 2,813,537 | 11/1957 | Lind | 137—353 |
| 2,861,171 | 11/1958 | Adler | 219—214 |
| 2,912,142 | 11/1959 | Schultz | 222—146 X |
| 2,975,797 | 3/1961 | Matheney. | |
| 3,133,671 | 5/1964 | Christine et al. | 222—146 X |

FOREIGN PATENTS

| | | |
|---|---|---|
| 599,314 | 3/1948 | Great Britain. |
| 678,226 | 8/1952 | Great Britain. |

RICHARD M. WOOD, *Primary Examiner.*